US008682398B2

(12) United States Patent (10) Patent No.: US 8,682,398 B2
Mullen (45) Date of Patent: *Mar. 25, 2014

(54) SYSTEMS AND METHODS FOR PROVIDING REMOTE INCOMING CALL NOTIFICATION FOR CELLULAR PHONES

(76) Inventor: Jeffrey David Mullen, Pittsburgh, PA (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/453,659

(22) Filed: Apr. 23, 2012

(65) Prior Publication Data

US 2012/0208596 A1 Aug. 16, 2012

Related U.S. Application Data

(63) Continuation of application No. 10/797,801, filed on Mar. 9, 2004, now Pat. No. 8,165,640.

(60) Provisional application No. 60/455,218, filed on Mar. 14, 2003.

(51) Int. Cl.
*H04B 1/38* (2006.01)
(52) U.S. Cl.
CPC .................................... *H04B 1/38* (2013.01)
USPC ...................... 455/567; 455/412.2; 455/569.1
(58) Field of Classification Search
USPC ............ 455/412.2, 567, 66.1, 88, 575.3, 557, 455/41.1, 41.2, 92
See application file for complete search history.

(56) References Cited

U.S. PATENT DOCUMENTS

| | | | |
|---|---|---|---|
| 5,752,203 A | 5/1998 | Yamashita | |
| 6,160,489 A | 12/2000 | Perry et al. | |
| 6,216,017 B1 * | 4/2001 | Lee et al. | 455/567 |
| 6,226,536 B1 | 5/2001 | Miyashita | |
| 6,249,222 B1 | 6/2001 | Gehlot | |
| 6,263,218 B1 * | 7/2001 | Kita | 455/567 |
| 6,697,647 B2 | 2/2004 | Higuchi et al. | |
| 6,978,164 B2 * | 12/2005 | Vicendese | 455/575.6 |
| 2002/0016188 A1 * | 2/2002 | Kashiwamura | 455/568 |
| 2002/0115478 A1 * | 8/2002 | Fujisawa et al. | 455/567 |
| 2003/0040286 A1 | 2/2003 | Walter | |
| 2003/0176205 A1 | 9/2003 | Oota et al. | |
| 2004/0058647 A1 | 3/2004 | Zhang et al. | |

FOREIGN PATENT DOCUMENTS

| | | |
|---|---|---|
| JP | 10-155012 | 6/1998 |
| JP | 2001086202 A | 3/2001 |
| JP | 2001352378 A | 12/2001 |

* cited by examiner

*Primary Examiner* — Melur Ramakrishnaiah

(57) ABSTRACT

The present invention provides a remote notification to a user of a cellular, or mobile, phone as the result of a particular activity or any activity at all (e.g., an incoming call from a particular person, group, or just an incoming call). In one embodiment, a sensing device is provided on the cellular phone that communicates/routes an alert to a remote notification device. In one economical embodiment, the notification device may have a short wire-based communication channel (e.g., roughly 1 foot to 5 feet) and only have a single output device (e.g., a light-emitting device). Thus, a woman may be able to quietly receive notifications of a cell phone event when her cell phone is stored in her purse.

20 Claims, 5 Drawing Sheets

SYSTEMS AND METHODS FOR PROVIDING REMOTE INCOMING CALL NOTIFICATION FOR CELLULAR PHONES

CROSS-REFERENCE TO RELATED APPLICATION

This application is a continuation of U.S. patent application Ser. No. 10/797,801 filed on Mar. 9, 2004 which claims the benefit of U.S. Provisional Patent Application No. 60/455,218 filed on Mar. 14, 2003 which are all hereby incorporated by reference herein in their entirety.

BACKGROUND OF THE INVENTION

The present invention relates to cellular notifications. One notification in which the present invention is particularly useful is for incoming call notifications. Traditional incoming call notification devices for cellular phones are deficient because they exist physically on the cellular phone.

Currently, mobile phones, and devices cable of receiving wirelessly transmitted calls, generally have two schemes of notifying a user of incoming calls when that user has the phone stored, for example, in a user's purse. The first scheme provides signals that may be heard by the user (e.g., ring tones or beeps). The second scheme provides a tactile signal (e.g., a vibration).

However, both of these signals originate physically from the cell phone and some user's do not store his/her cell phone in a location where these signals can be recognized. For example, women usually store their cells phones in a purse. Here, when a cell phone rings, the ring can be missed by the audible dampening effects of the user's purse. Additionally, a vibrating cell phone can not be physically sensed by a user if that cell phone is in a remote storage location with a tactile dampening effect (e.g., a purse).

It is therefore desirable to provide systems and methods that allow incoming calls to be recognized by a user even when the user cannot hear or sense audio signals or vibration signals (e.g., incoming call notification signals) emanating from that user's cell phone.

SUMMARY OF THE INVENTION

It is an object of the present invention to provide systems and methods that allow incoming calls, or other cell phone events or notifications, to be recognized by a user even when the user cannot hear or sense audio signals or vibration signals physically emanating from the cellular phone.

In one embodiment, a user signaling device is provided at the end of an extension that is connectable to a user's cell phone. The device can detect when there is an incoming call, or other action that the user desires to be notified of (e.g., a calendar reminder), and provide a supplemental notification signal to the user. A clip, or other attaching device, may be included on the user signaling device so that the user may attach the signaling device in a position where that user can detect the devices incoming call notifications (e.g., on a purse strap or on a piece of clothing). Notifications can take the form of audible signals (e.g., cell phone rings), mechanical signals (e.g., vibrations, or any other type of notification signal (e.g., light pulses).

A wireless user signaling device does not need an extension. Instead, the user signaling device may be notified of incoming calls wirelessly by a notification transmitting device attached to the cellular phone. Alternatively, the user signaling device may communicate wirelessly with the cellular phone itself. The user signaling device may be set up to provide different types of signals that a user can distinguish dependant on what the cellular phone is trying to notify the user about (e.g., calendar event, incoming call, missed call, new message). A wireless user signaling device may be attached to remote areas on the user. For example, a wireless user signaling device may be attached to a user's watch, clothing, or glasses. A wireless user signaling device may be integrated into a user's glasses, contacts, or clothing.

The user signaling device may also be provided as software in a different device that the user is already in a position to receive notification signals from. For example, if the user has a beeper and a cellular phone, the user signaling software may be utilized such that the beeper vibrates whenever the cellular phone receives, for example, an incoming call signal. In another embodiment, a user's watch may vibrate whenever that users cellular phone desires to contact the user and notify the user of, for example, an incoming call.

Inexpensive systems may be constructed that may still offer a great utility to a user. For example, one notification device may consist of only a light emitting device (e.g., an LED) and related circuitry. An extension may connect the device to a cellular phone. Such a device, and similar devices that only consist of a few (e.g., one or two) types of notification with little other functionality may provide a very inexpensive, but desired, function to a user.

Another type of routing communications from a cellular phone is an autonomous recognition of a cellular phone notification. Although such a scheme may be difficult for a remote notification device that forwards multiple types of notifications, such a scheme may be very useful for routing a small number of notifications to a user. For example, a vibrational sensor may be coupled to a remote notification device via an extension. Such a sensor may be attached (e.g., velcroed) to a cellular phone such that when the phone vibrates (or vibrates in a certain manner) the remote notification device produces a notification signal (e.g., the device emits light, sound, or tactile signal). Some cellular phones vibrate differently for different alerts. For example, a cellular phone may vibrate multiple times for an incoming call but only once for a calendar event. Such a vibrational sensor may be coupled to control circuitry that may, for example, distinguish such alerts and provide a different type of remote alert to a user (e.g., different colors of light may be emitted).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
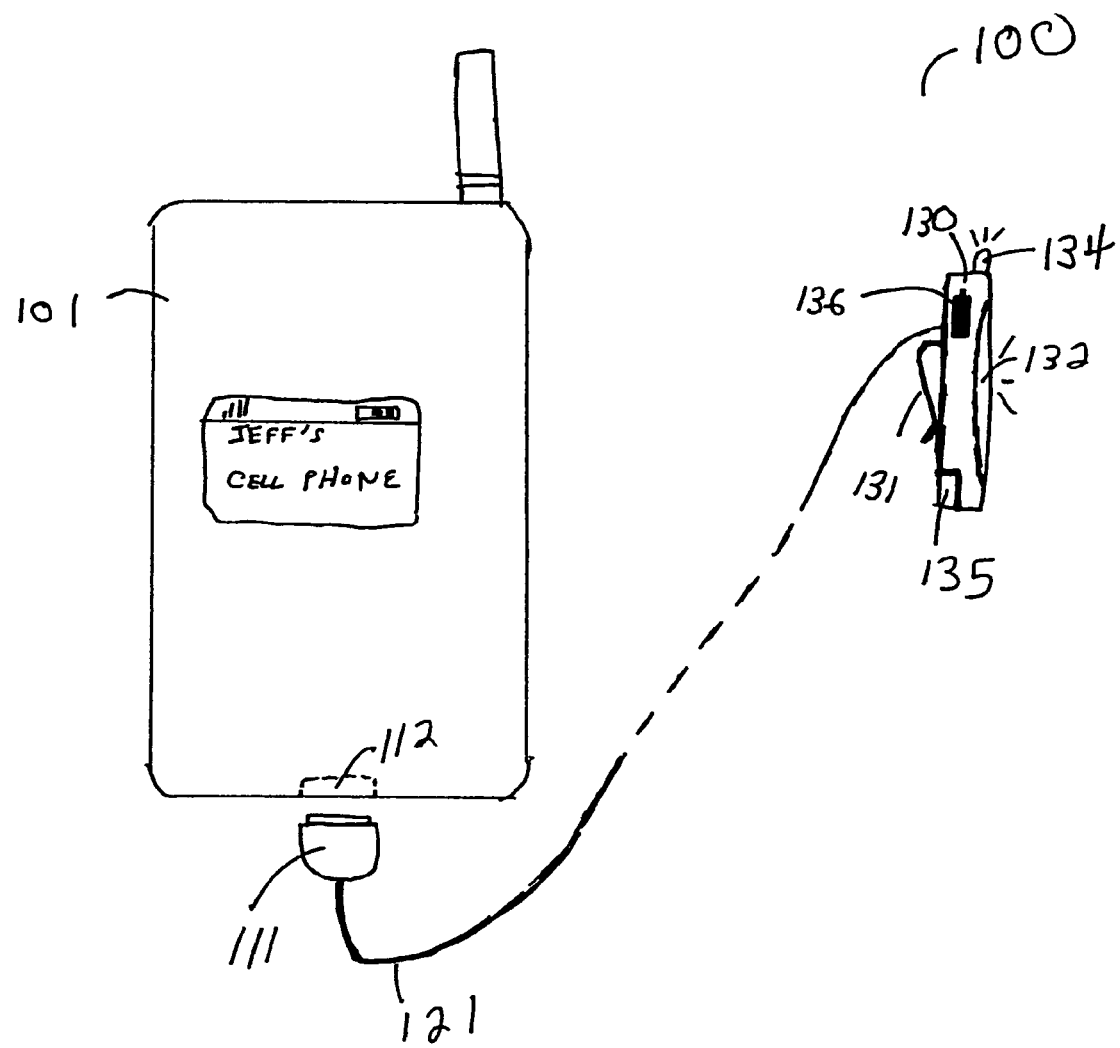
FIG. 1 is an illustration of a non-wireless remote cell phone notification device and cell phone constructed in accordance with the principles of the present invention.

FIG. 1 depicts environment 100 that includes cell phone 101 and remote notification device 130. Cell phone 101 includes communication device 112. Remote notification device 130 includes communication device 111. Generally, remote notification device 130 responds to signals from communication device 112 and alerts a user of a cell phone activity or event. For example, remote notification device 130 may alert a user when cell phone 101 receives an incoming call, a calendar notification occurs, a reminder occurs, a missed call occurs, a new voice or text message is received, or any other cell phone activity.

Communication devices 112 may be, for example, the headset (e.g. headphone) output, input/output connection, speaker, or vibrational output of cell phone 101. For cellular phones that produce a ring in a headset when an incoming call is received, the headset output may provide a universal way for remote notification device 130 to communicate with cell phone 101. In other words, each cell phone model, or the cell phones of a particular carrier, may have different types of input/output contacts. If, for example, the headphone jack is utilized as communication device 112, remote notification device 130 may not need to be reconfigured with a different communication device 111 for different cell phone models.

In this manner, communication device 112 may be the speaker or vibration device of cellular phone 101. Thus, communications device 111 may detect the audible signals or vibrations that emanate from cell phone 101. Furthermore, utilizing the input/output communication contacts of cell phone 101 as communication device 112 allows for remote notification device 130 to not only receive communication signals from cell phone 101 but also allows remote notification device 130 to send communication signals to cell phone 101 (e.g. a signal to pick up the phone, voice signals to talk via cell phone 101).

The microphone jack may also be connected to remote notification device 130 such that remote notification device may be utilized to receive voice signals from the headphone jack of cell phone 101 and provide voice signals to the microphone jack of cell phone 101. In this manner, a user can recognize an incoming call, communicate to, for example, cell phone 101 that he/she wishes to have a conversation, and send/receive voice signals through remote communication device 130.

Remote communication device 130 may include battery 136 or may be powered from the power supply of cell phone 101. Remote communication device 130 may also include attaching device 131 which may be, for example, a clip, belt, band, chain, or any other attaching, securing, bonding, or affixing device. Remote notification device 130 may signal a user of a cell phone action (e.g., incoming call) through, for example, light emitting device 134, speaker 132, vibrating device 135, and/or any other device that a user can recognize a signal from.

Figure 2:
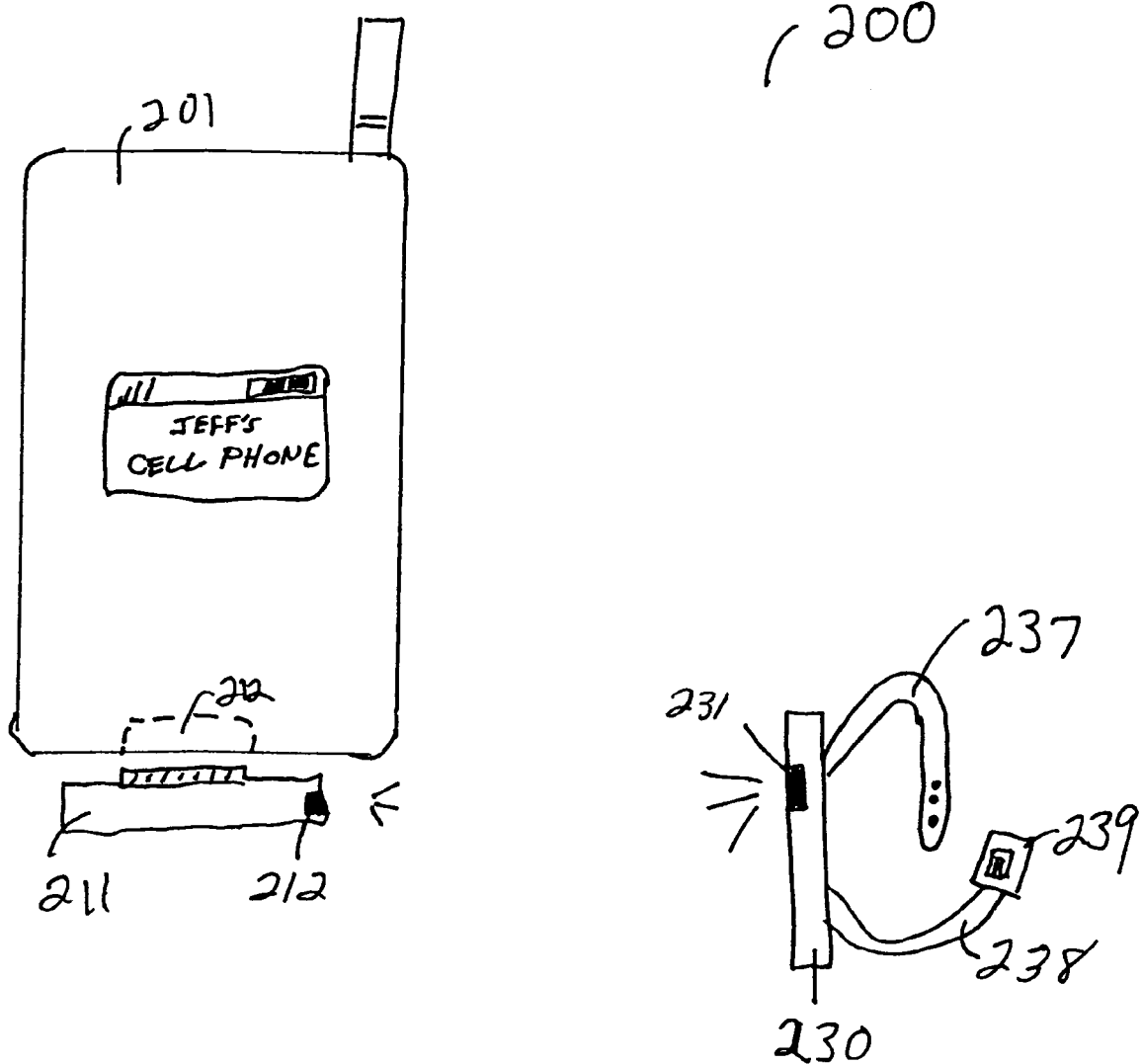
FIG. 2 is an illustration of a wireless remote cell phone notification device and cell phone constructed in accordance with the principles of the present invention.

FIG. 2 depicts environment 200 that includes cell phone 201 and remote notification device 230. Remote notification device 230 includes wireless communications device 231 that can communicate with a wireless communications device located on cell phone 201. Communications device 211 may also be connected to cell phone 201 and may be utilized to transmit/receive signals wirelessly to/from remote notification device 230 through communications port 212. Communications device 211 may interface with cell phone 201 at cell phone communications port 212, or have any function or attribute, similar to the interfacing of, functionality, or attributes included in communications device 111 of FIG. 1 can interface with cell phone 101 of FIG. 1.

In simple embodiments, communications device 211 (or cell phone 201) only sends communications signals to remote notification device 230. As a result communications device 211 (if needed) and communications device 231 can be manufactured for a small cost.

Remote notification device 230 may be embedded into a device that is commonly used by users (e.g., a watch, glasses, clothing) and may attach to a user by a variety of devices (e.g., bands 237 and buckle 239). Additionally, the functionality of remote notification device 230 may be embedded into a device that is commonly utilized by users. For example, if a user's watch has a wireless communications device, software may be included in the watch to provide a functionality similar to remote notification device 230.

Persons skilled in the art will appreciate that remote notification device 230 of FIG. 2 and remote notification device 130 of FIG. 1 is not limited to use with cell phones. Such a remote notification device can provide remote user signaling for other devices such as, for example, PDA's, laptops, beepers, non-wireless phones, radios, and GPS enhanced devices.

An amplifier may also be provided in remote notification devices. Such an amplifier would allow for stronger notifications to be transmitted to a user. For example, if a notification of an incoming call is provided as a ring or beep from a remote notification device, an amplifier can increase the strength of the ring/beep.

Figure 3:
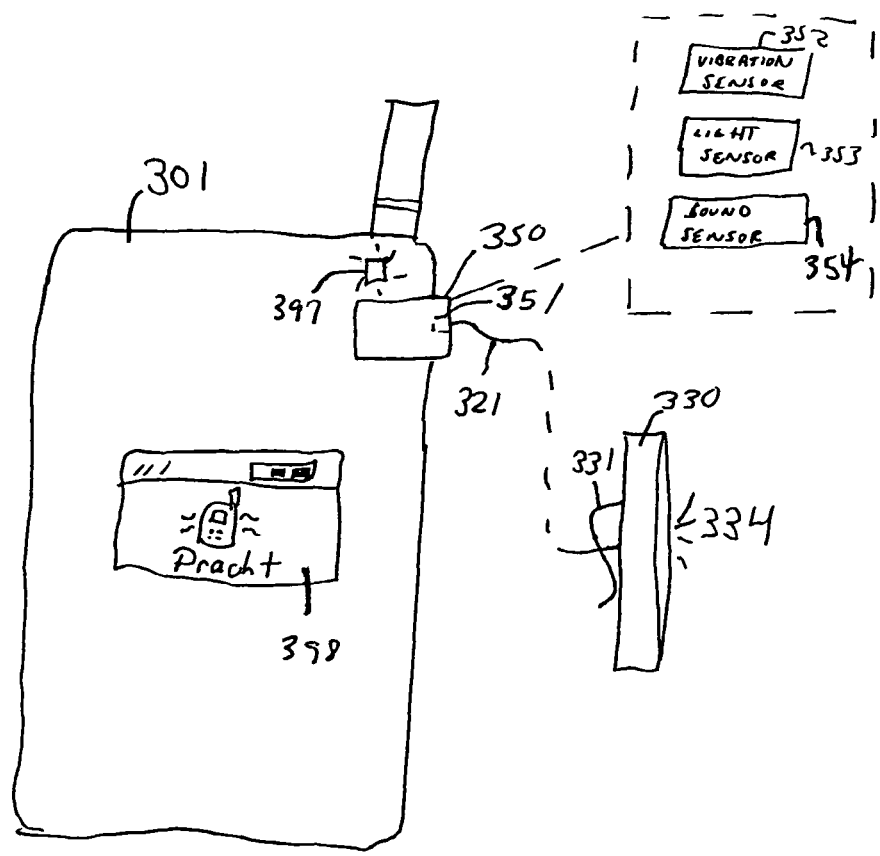
FIG. 3 is an illustration of an autonomous remote cell phone notification device and cell phone constructed in accordance with the principles of the present invention.

Turning now to FIG. 3, system 300 is illustrated that includes autonomous notification sensing device 350 attached to cellular phone 301. Autonomous-device 350 may be affixed to cellular phone 301 by, for example, a glue or a tape. In this manner, autonomous device 350 may be sold with a covered piece of glue or tape such that a user may affix device 350 to their cellular phone 300. Alternatively, device 350 may be attached to cellular phone 300 by, for example, velcro, clip, or other fastening device. In this manner, a user may attach device 350 to cellular phone 300 when the user is remotely located from cellular phone 300 (e.g., cellular phone 300 is in the user's purse or is in another room).

Extension 321 may be included to electrically couple notification device 330 to autonomous device 350. Extension 321 may be provided in a variety of lengths. In one embodiment, extension 321 is between roughly a foot and five feet long such that a user may easily attach notification device 350 to the outside of a purse. Extension 321, however, may be of any size. For example, extension 321 may be 50 feet long such that a cell phone placed in a charger may have incoming call notifications forwarded to a different room. In this manner, autonomous sensing device 350, or any type of sensing device, may be included on a cell phone charger. Extension 321 may be connectable to autonomous device 350 and/or notification device 330. For example, female connection port 351 may be included on autonomous device 350 that may be operable to receive a male connection port (not shown) located on extension 321. Instead of extension 321, communication between autonomous device 350 and notification device 330 may occur wirelessly (e.g., infrared, WiFi, bluetooth, etc.). Such a communication may be one-way (e.g., from autonomous device 350 to notification device 330) or two-way (e.g., to turn autonomous device 350 OFF). Persons skilled in the art will appreciate that autonomous device 350 may also electrically couple with cellular phone 300 and communicate with it. Autonomous device 350, however, has a general benefit of being able to recognize alerts (e.g., incoming call alerts) from any model/make of cellular phone with a particular notification method like, for example, a vibrating mode.

Autonomous device 350 may sense an incoming call (or other alert) in a variety of ways. For example, autonomous device 350 may include vibration sensor 352 to determine when cellular phone 300 vibrates. Such vibration sensors are widely known and may be, for example, in a piezoelectric-based or a mechanical, ball-in-tube-based configuration. Control circuitry to determine when a cellular phone vibration occurs may be included and may be located in either autonomous device 350 or notification device 330. Such control circuitry may, for example, be able to distinguish ambient motion (e.g., the soft-motion of somebody walking or a single hard-motion of a purse hitting a counter-top) from a vibrating cell-phone motion (e.g., a high-frequency, hard, repetitious motion). Such control circuitry may be configured for use with a particular phone and may have inputs that allow a user to adjust the sensitivity/operation of either device 350 or 330.

Light sensor 353 may be included in autonomous device 350 any may, for example, determine when light emanates from display 398 or light-emitting notification 397. In this manner, autonomous device 350 may be attached over either display 398 or light-emitting device 397 in order to determine when an alert occurs. Control circuitry may similarly be included to determine when such an event occurs and may be utilized to distinguish different events (e.g., when a cellular phone vibrates in different manners or emits light in different manners depending on the type of alert). Other types of autonomous sensors may also be utilized. For example, sound sensor 354 may be included to determine when an alert occurs.

Autonomous sensing device 350, or any sensing device herein, may also be provided in a battery (e.g., a rechargeable battery) for cellular/mobile phone 300. For example, some batteries include a vibrating means that produces vibrations when, for example, an incoming call occurs. A sensing device may, in this manner, be utilized in a cell phone battery to route a signal indicative of the incoming call (or alert) to a remote notification device or sense a notification signal in the battery (e.g., the vibrating of the battery). Such a device could also be electrically coupled between all of, or a portion of, the communication path between the cellular battery and cellular phone 300.

Notification device 330 may be similar to any notification device described in connection with, for example, system 100 of FIG. 1 or system 200 of FIG. 2. For inexpensive embodiments, notification device 330 may include a single way to notify the user of alerts (e.g., an incoming call, calendar event, location-based alerts). In this manner, notification device 330 may include, for example, a light-emitting device that emits light of one or more colors. Attachment device 331 may also be included such that device 330 may be attached to a variety of structures.

Figure 4:
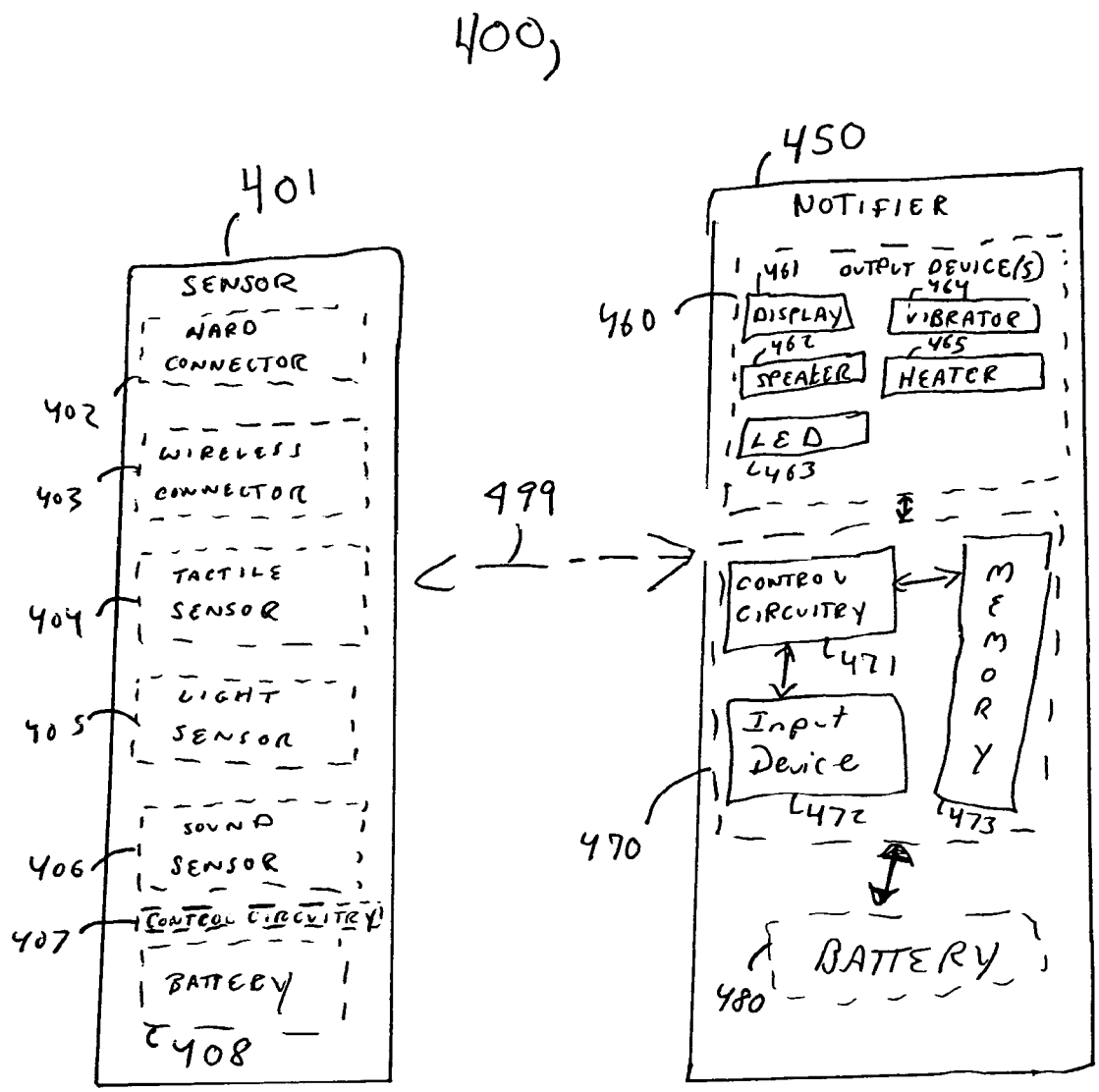
FIG. 4 is an illustration of a remote cell phone notification device topology constructed in accordance with the principles of the present invention.

Next is FIG. 4 where topology 400 is shown. Topology 400 included sensing device 401 and notification device 450 that may be communicate to each other via communications channel 499. Any component of a notification device 450 may be included in sensing device 401. Similarly, any component of sensing device may be included in notification device 450. Alternatively, components of a cellular phone may be included in either sensing device 401 or notification device 450.

Sensing device 401 may include, for example, one or more connecting ports 402 and/or 403, tactile sensor 404, light sensor 405, sound sensor 406, control circuitry 407, and battery 408. Notification device may include, for example, one or more output devices 460, additional circuitry 470, and sources of electrical energy 480 (e.g., one or more batteries). Output devices 460 may include, for example, display 461, vibrator 464, heater/cooler 465, speaker 462, or light-emitting device 461 (e.g., an LED or other device that emits light). Additional circuitry 470 may include, for example, control circuitry 471, user-input devices 472 (e.g., an ON/OFF and/or volume switch) and memory 473.

Figure 5:
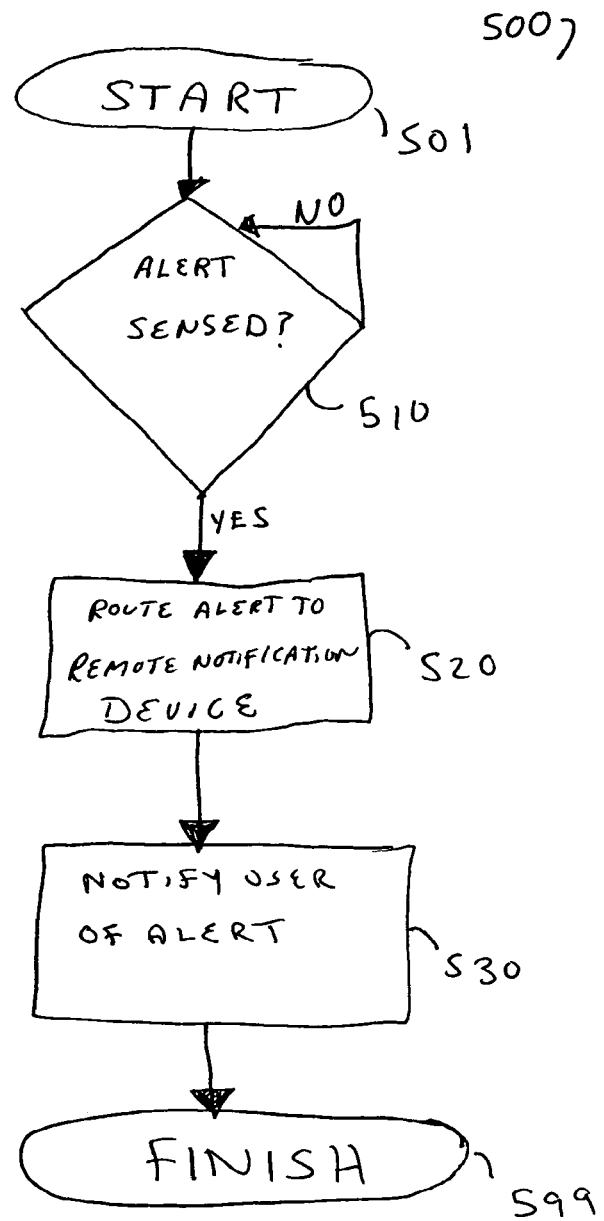
FIG. 5 is an illustration of a process flow chart of a remote notification device constructed in accordance with the principles of the present invention.

Process flow chart 500 is depicted in FIG. 5 and may be utilized in a variety of alert sensing, routing, and notification systems. Process 500 starts at step 501 and moves to step 510, in which the process is idle until an alert is sensed. When an alert is sensed step 520 is initiated that routes the alert (e.g., that an alert occurred or that a type of alert occurred), or a signal indicative of an alert/type of alert to step 530. At step 530, the user is notified that an alert, or a type of alert, occurred. Process 599 then ends at step 599. Person skilled in the art will appreciate that many variations of process 500 may be utilized. For example, a step of determining the type of alert may be utilized. Alternatively, a step of accepting user input and configuring the system based on that user input may be utilized.

Persons skilled in the art will also appreciate that the present invention is not limited to only the embodiments described. Instead, the present invention more generally involves providing a non-cell phone based notification to a user of a cell phone activity or event (e.g., an incoming call). Persons skilled in the art will also appreciate that the apparatus of the present invention may be implemented using other control methods, notification techniques, attachment components, remote hosting devices (e.g., watch), and configurations. For example, blue tooth communication devices may be used as the wireless communications devices. All such modifications are within the scope of the present invention, which is limited only by the claims that follow.

What is claimed is:

1. A system for use with a mobile telephonic device that provides notification of an incoming call, said system comprising:

a sensing device that is operable to be attached to said mobile telephonic device, wherein said sensing device is an autonomous sensing devices that senses user-perceivable signals from said mobile telephonic device and said sensing device provides communication signals indicative of an incoming call; and a remote communication device configured to receive said communication signals, wherein said communication device includes a battery, said communication device is configured to provide notification signals that are only light-based, and said notification signals are dependent upon said received communication signals.

2. The system of claim 1, wherein said sensing device and said remote communication device are electrically coupled via a wire.

3. The system of claim 1, wherein said communication signals are communicated wirelessly.

4. The system of claim 1, wherein said remote communication device includes an input device.

5. The system of claim 1, wherein said remote communication device includes memory.

6. The system of claim 1, wherein said sensing device includes a sensing device battery.

7. The system of claim 1, wherein said remote communication device is a watch.

8. The system of claim 1, wherein said remote communication device includes a band.

9. The system of claim 1, wherein said remote communication device includes a first band and a second band.

10. The system of claim 1, wherein said remote communication device includes a buckle.

11. The system of claim 1, wherein said remote communication device includes a first band, a second band, and a buckle.

12. The system of claim 1, wherein said sensing device includes a fastening device.

13. The system of claim 1, wherein said sensing device includes a clip.

14. The system of claim 1, wherein said remote communication device and said sensing device are electrically coupled via an extension between one and five feet in length.

15. The system of claim 1, wherein said sensing device communicates one-way to said remote communication device.

16. The system of claim 1, wherein said sensing device communicates two-ways with said remote communication device.

17. The system of claim 1, wherein said remote communication device includes an ON/OFF switch.

18. The system of claim 1, wherein said remote communication device is a watch and includes an ON/OFF switch.

19. The system of claim 1, wherein said remote communication device includes control circuitry.

20. The system of claim 1, wherein said sensing device includes control circuitry.

* * * * *